United States Patent [19]

Kelly et al.

[11] Patent Number: 4,670,835
[45] Date of Patent: Jun. 2, 1987

[54] DISTRIBUTED CONTROL STORE WORD ARCHITECTURE

[75] Inventors: Richard P. Kelly, Nashua, N.H.; Thomas F. Joyce, Westford, Mass.

[73] Assignee: Honeywell Information Systems Inc., Waltham, Mass.

[21] Appl. No.: 663,096

[22] Filed: Oct. 19, 1984

[51] Int. Cl.⁴ .............................................. G06F 9/30
[52] U.S. Cl. .................................................. 364/200
[58] Field of Search ... 364/200 MS File, 900 MS File

[56] References Cited

U.S. PATENT DOCUMENTS

| 4,109,311 | 8/1978 | Blum et al. | 364/200 |
| 4,110,822 | 8/1978 | Porter et al. | 364/200 |
| 4,149,243 | 4/1979 | Wallis | 364/200 |

Primary Examiner—Eddie P. Chan
Attorney, Agent, or Firm—George Grayson; John S. Solakian; William A. Linnell

[57] ABSTRACT

Apparatus that provides interrupt operation in a central processor based system wherein internal subsystems are operated via addresses generated by a next address generator in the processor and sent to control stores associated with each subsystem to thereby read out firmware instructions which are used by a controller in each subsystem to control the operations of same. When a special condition is detected in ones of the subsystems a trap signal is sent to the next address generator which responds by generating a microinstruction address to the subsystem that generated the trap signal. The subsystem responds to the microinstruction to read out a register, the contents of which indicate the status of processing in the subsystem including the special condition. The register contents are forwarded to the processor which tests same to determine the nature of the special condition and calls a microprogram the microinstructions of which are applied to the control store of the subsystem that generated the trap signal. The subsystem responds to the microinstructions to clear the special condition. Certain subsystems may alternately send a special condition indicating signal directly to the next address generator, rather than a trap signal, and responsive thereto the next address generator calls the required microprogram to be applied to the control store of the subsystem that generated the indicating signal.

8 Claims, 6 Drawing Figures

DISTRIBUTED CONTROL STORE WORD ARCHITECTURE

RELATED APPLICATIONS

The following patent applications, which are assigned to the same assignee as the instant application, have related subject matter and are incorporated herein by reference. Certain portions of the system and processes herein disclosed are not our invention, but are the invention of the below-name inventors as defined by the claims in the following patent applications:

U.S. patent application Ser. No. 663,101, filed Oct. 19, 1984, now U.S. Pat. No. 4,641,305 entitled, "Control Store Memory Read Error Resiliency Method and Apparatus", by Thomas F. Joyce and Richard P. Kelly.

BACKGROUND OF THE INVENTION

1. Field of the Invention

The method and apparatus of the present invention generally relates to an architecture for distributing a control store memory used to control a programmable device and, more particularly, to a control store memory architecture of a microprogrammed electronic data processing system in which multiple subunits have their own local control store memories.

2. Description of the Prior Art

It is common practice today to implement data processing systems in which the software instruction is executed by use of microprocessors which are firmware controlled. In this type of system, the firmware is stored as a series of microinstructions in a memory referred to as a control store. The control store may be a random access memory (RAM) which can be written into, as well as read from, or it may be a read only memory (ROM) of one type or another. A control store memory of the read only type is often referred to as read only storage as ROS. The use of firmware is increasing with more of the logic of systems being microprogammable.

Today, it is common to find in electronic data processing systems a central peripheral that is microprogram controlled as well as various peripheral controllers, each of which may be microprogram controlled. In such systems, the control store of the central processing unit (CPU) is controlled and addressed by logic located within the central processor and the control stores associated with each of the peripheral controllers are controlled and addressed by logic contained within each of the peripheral controllers. A more recent development is to have multiple subunits within a unit controlled by one or more control store memories. One such system is shown in FIG. 1 in which the CPU is composed of microprocessor 1, commercial instruction processor 3, microprocessor ROS 9, and commercial instruction processor ROS 11. The central processor communicates to main bus 27 via lines 46. Main bus 27 is comprised of address, data and cotnrol lines which are used by the various units to transfer information among them. Main memory 29 communicates to main bus 27 by lines 48 and is used to store software program instructions and data to be used by the central processing unit. Peripherals 31 and 33 communicate via lines 50 and 52, respectively, to main bus 27 and are used to input, output and store date within the electronic data processing system.

In the CPU of this system, the commercial instruction processor (CIP) 3 works in parallel with microprocessor 1. Microprocessor 1 is responsible for performing binary arithmetic and logic operations within the central processor. It is also the master subunit responsible for controlling which microinstruction will be read from the control store comprised of microprocessor ROS 9 and CIP ROS 11. The next address generation logic 67 in microprocessor 1 generates an address which is output on lines 12 to ROS address register 19. This address is latched into ROS address register 19 at the appropriate time during the execution of a microinstruction with the output of ROS address register 19 being a 12-bit address, signal ROSADDR, on lines 2 which is used to address microprocessor ROS 9 and commercial instruction processor ROS 11. This 12 bits of address are indicated by the number 12 next to the diagonal slash on line 2. The 12-bit ROS address can address any one of the 4K (1K = 1024) 48-bit word microinstructions in microprocessor ROS 9 and any of the 2K 8-bit microinstructions in CIP ROS 11. If the address is between 0 and 2047, a 48-bit microinstruction word is read from microprocessor ROS 9 with all 48 s going to ROS data register 53 of microprocessor 1 with 35 bits being signal MPROSDT on lines 4 and 13 bits being signal CMROSDT on lines 8. The 13 bits signal CMROSDT on lines 8 also go to ROS data register 55 of commercial instruction processor 3. If the 12-bit ROS address specifies an address between 2048 and 4095, a 56-bit microinstruction is read from the control store memory with 48 bits coming from microprocessor ROS 9 and 8 bits coming from CIP ROS 11. In this case, the 35 bits of signal MPROSDT on lines 4 go to ROS data register 53, the 13 bits of signal CMROSDT on lines 8 go to ROS data register 53 and ROS data register 55 and the 8 bits of signal CIPROSDT on lines 6 go to ROS data register 55.

After the microinstruction is read out and becomes available to microprocessor 1 from ROS data register 53, some of the bits within the microinstruction word are used to determine the address of the next microinstruction to be read from the control store. These bits are transferred to next address generation logic 67 on lines 10. In addition, there are 4 bits from indicator register 61 of commercial instruction processor 3 which are transferred to next address generation logic 67 on line 60. These 4 bits on line 60 from indicator register 61 enter the computation of the next control store address if the microinstruction being processed by microprocessor 1 contains a microoperation specifying that a major branch is to be done based upon the conditions of the four bits from indicator 61. Through this mechanism, the microinstruction programmer has the ability to take into account various conditions rising within commercial instruction processor 3 by programming branch on indicators microoperations within the microinstructions stored in microprocessor ROS 9. The ability to control the flow of microinstructions by controlling the generation of the next microinstruction address can be seen in the firmware flow chart of FIG. 2.

In FIG. 2, block A contains a microinstruction MP1 which performs an operation within microprocessor 1. Block A contains no microoperations to be performed by commercial instruction processor 3. In block B, microoperation MP2 is programmed to be performed by microprocessor 1 and CIP2 is programmed to be performed by commercial instruction processor 3. In block C, microprocessor 1 executes microoperation MP3 and commercial instruction processor 3 executes microoperation CIP3. Within microoperation MP3, a branch on indicators is programmed. If the branch is taken because the tested indicators are set, the microinstruction corresponding to block H is read from the control store and the microoperation MP6 is executed by microprocessor 1 and CIP6 is executed by commercial instruction processor 3. Block I is then performed executing microinstruction MP7 in microprocessor 1 and CIP7 in commercial instruction processor 3. Microoperation MP7 contains within it a branch to block F so that the next microinstruction is read from location F of the control store which contains microoperations MP8 and CIP8. If the microinstruction in block C did not take the branch because the indicator conditions were not set, block D would be read and microoperation MP4 would be executed by microprocessor 1 and CIP4 would be executed by commercial instruction processor 3. Block E would then be read and microoperation MP5 would be executed by microprocessor 1 and microoperation CIP5 by commercial instruction processor 3. At this point, the microprogram returns to the main path and block F would be executed with microoperations MP8 being performed by microprocessor 1 and CIP8 being performed by commercial instruction processor 3. Block G would then be entered with microprocessor 1 performing microoperation MP9 and the commercial instruction processor 3 perfroming a no operation. A more detailed discussion of the operation of the central processor illustrated in FIG. 1 and the method of executing a microprogram illustrated in FIG. 2 can be found in U.S. patent application Ser. No. 537,991 now U.S. Pat. No. 4,608,659 entitled, "A Commercial Instruction Processor for Performing Decimal Arithmetic Operations" having inventors John J. Bradley, Theodore R. Staplin, Jr., Ming T. Miu, Thomas C. O'Brien, George M. O'Har, Melinda A. Widen and Brain L. Stoffers.

Although the above system works quite well in that it allows subunits within a unit to be controlled by a common control store, it has the disadvantage that the number of subunits within the system must be predetermined because the next address generation logic is designed to handle a predetermined number of external conditions and the microoperations which control the unit containing the next address generation logic must also be predetermined in order to be able to branch on these various external conditions. It has the further disadvantage that a programmer writing the firmware for the unit must be aware when a condition can arise in any one of the subunits and must program test branches within the firmware in order to test for the existence of the condition within the microprogram. In addition, the test branches within a microprogram may also lengthen the microprogram and cause it to be executed more slowly than would otherwise be the case if the microprogram did not have to test for external conditions in other subunits.

If the master subunit controlling the generation of the control store address is a signal integrated circuit, or if the next address generation logic of the master subunit controlling the addressing of the control store is a single integrated circuit, it may be impossible to accommodate the addition of other subunits within the system which may cause external conditions which need to be tested by the master subunit in order to access that portion of the microprogram written to respond to the external condition.

Therefore, what is needed is an architecture which permits microprogrammed subunits to be easily added to a unit without having to change logic within the master subunit controlling the generation of the control store address.

OBJECTS OF THE INVENTION

Accordingly, it is an object of the present invention to provide an architecture in which microprogrammed subunits can be added without having to change the master unit controlling the generation of the control store address.

It is another object of the present invention to provide an architecture that allows the control store to be distributed so that control substores can be located near the logic used to execute the microoperations contained in their associated control substores.

It is another object of the present invention to provide an architecture that does not require a master subunit to test for conditions within subunits which require handling by a special microprogram.

It is a still further object of the present invention to provide an architecture which frees the microprogrammer from having to write the microprogram to continually test for external conditions which require special handling.

This invention is pointed out with particularity in the appended claims. An understanding of the above and further objects and advantages of this invention can be obtained by referring to the following description taken in conjunction with the drawings.

SUMMARY OF THE INVENTION

The present invention provides for the control store used to hold microinstructions of a programmable unit to be distributed throughout the unit so that each local control substore can be located near the subunit logic controlled by microoperations read from its associated local control substore. A master subunit is responsible for generating the address of the next microinstruction to be read from the control substores. The loosely coupled subunits can cause a trap in the master subunit so that the master subunit can be made aware of conditions in a subunit which require special handling by a microprogrammed routine. Logic is provided for the master subunit to poll the subunit by transferring data from subunits to the master subunit so that the master subunit can determine which subunit caused the trap to occur and what particular condition requires attention. Logic is also provided to inhibit, under microprogram control, subunits from causing a trap to the master subunit.

BRIEF DESCRIPTION OF THE DRAWINGS

The manner in which the method of the present invention is performed and the manner in which the apparatus of the present invention is constructed and its mode of operation can best be understood in light of the following detailed description together with the accompanying drawings in which like reference numbers identify like elements in the several figures and in which.

DESCRIPTION OF THE PREFERRED EMBODIMENT

Figure 3:
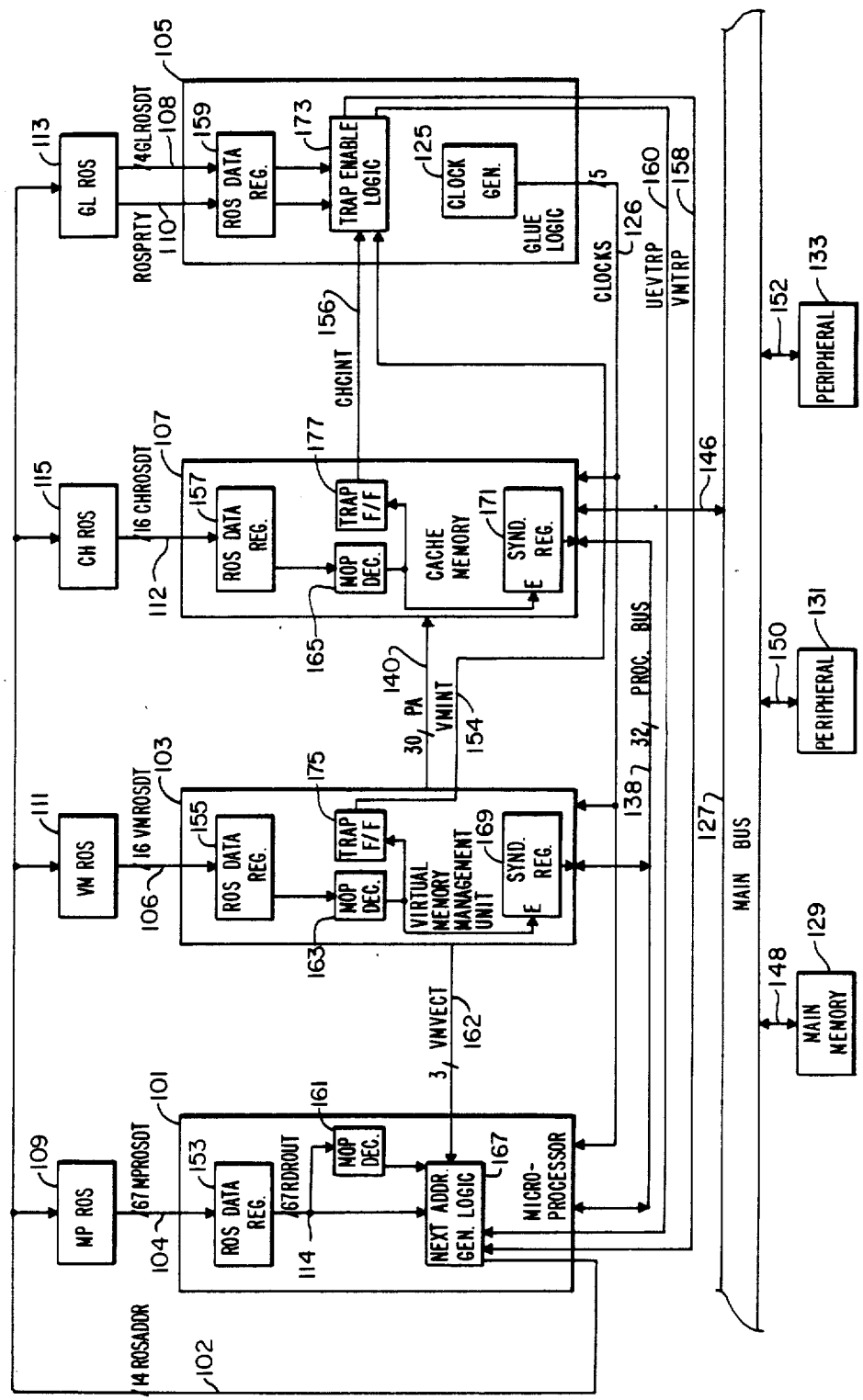
FIG. 3 is a block diagram of a data processing system incorporating the present invention.

The central processor unit (CPU) and other elements comprising the electronic data processing system of the preferred embodiment of the present invention are illustrated in FIG. 3. In FIG. 3, the CPU is comprised of those elements above main bus 127. The CPU communicates with the other elements in the system through lines 146 via cache memory 107 which contains address, data and control lines to main bus 127. Main bus 127 is also comprised of address, data and control lines and serves as the main path for information which is communicated between main memory 129 and peripherals 131 and 133. Main memory 148 stores data and software program instructions which are executed by the CPU. Main memory 129 is connected to main bus 127 by lines 148. Peripherals 131 and 133, which are connected to main bus 127 by lines 150 and 152 respectively, are input/output units which are used to enter, retain or output data into and out of the system.

The logic of the central processor unit can be divided into four subunits as shown in FIG. 3. Microprocessor 101 performs the basic arithmetic and logic operations of the central processor unit by executing the software instructions of the software program stored in main memory 129. Virtual memory management unit 103 converts the virtual memory addresses contained in the software instructions into a physical address which is passed to cache memory 107 on lines 140. In the preferred embodiment, the virtual address from microprocessor 101 is translated into a 30 bit physical address by virtual memory management unit 103. Cache memory 107 takes the physical address provided by virtual memory management unit 103 and does either a read memory or write memory operation from or to main memory 129 or retrieves the data or software instruction from its own internal memory. The information retrieved from cache memory 107 is provided to microprocessor 101 or virtual memory management unit 103 through processor bus 138 which is a 32 bit wide bus. Processor bus 138 is the prmary bus in the CPU for the interchange of addresses and data between the microprocessor 101, virtual memory management unit 103 and the cache memory 107. Glue logic 105 contains miscellaneous logic which ties microprocessor 101, virtual memory management unit 103 and cache memory 107 together and, as illustrated in FIG. 3, contains a ROS data register 159, trap enable logic 173 and clock generator 125.

The central processor unit of FIG. 3 is firmware controlled such that the microprocessor 101, virtual memory management unit 103, cache memory 107 and glue logic 105 each are cotrolled by microoperations from microinstructions contained within the control store. As illustrated in FIG. 3, the control store of the preferred embodiment is a read only storage, which is distributed throughout the processor so that the microoperations for the various subunits are stored in a local read only storage (ROS) which is close to the logic which utilizes the microoperations. This distribution of the ROS had the advantage that the relatively narrow 14-bit address which is used to address the control store is distributed to the microprogrammed subunits of the central processor, whereas the relatively wide 104 bit microinstruction is broken into 4 segments so that each of the local ROS's is close to the logic which utilizes the various microoperations. Therefore, as can be seen in FIG. 3, microprocessor 101 obtains its 67 bits of microoperations as signal MPROSDT on lines 104 from microprocessor ROS 109. Virtual memory management unit 103 obtains its 16 bits of microoperations as signal VMROSDT on lines 106 from virtual memory ROS 111. Cache memory 107 obtains its 16 bits of microoperations as signal CHROSDT on lines 112 from cache ROS 115, and glue logic 105 obtains its 4 bits of microoperations as signal GLROSDT on lines 108 from glue ROS 113. In addition, glue logic ROS 113 provides on line 110 a signal ROSPRTY which is an overall ROS odd parity bit so that each 103 bit microinstruction has a 104th bit of odd parity associated with it. That is, the number of bits in the binary ONE state in each 104-bit microinstruction word in the control store will be an odd number.

The addressing of the control store, which is composed of the four ROS's 109, 111, 113 and 115 is under the control of microprocessor 101 as the master subunit which calculates the address of the next microinstruction and produces a 14-bit address as signal ROSADDR on lines 102 which is used to address each of the ROS's. This 14-bit control store address allows for the addressing of 16K (1K=1024) of 104-bit words in the control store.

By having an odd parity bit (ROSPRTY) as bit 104 associated with each microinstruction, the central processor unit is able to detect whether the microinstruction word read from the control store was read without a single bit error. The detection of read errors as each microinstruction word is read from the control store is performed by parity a calculator-checker (not shown in in FIG. 3) in glue logic 105. If the parity calculator-checker detects a difference between the parity calculated for the microinstruction word and the parity bit contained in the microinstruction word, it produces a cancel which prevents clock generator 125 from generating clocking signal CLK4 on lines 126. If the calculated parity does not agree with the stored parity, the cancel signal is used to cancel the execution of the current microinstruction which contains a read error. The microinstruction is then reread from the control store and re-executed.

Figure 6:
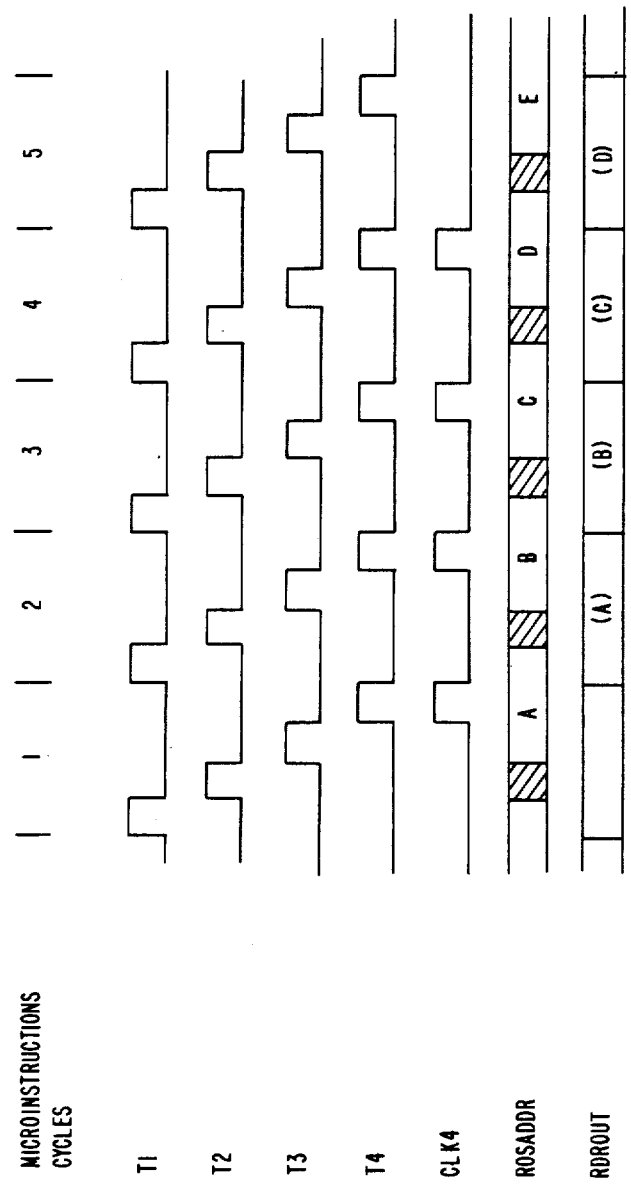
FIG. 6 is a timing diagram of various clocking, control store addressing, and control store data signals used by the logic of FIGS. 3 and 5.

In addition to producing clock signal CLK4 on lines 126, clock generator 125 produces clock signals T1, T2, T3 and T4. These four clock signals T1 through T4 and CLK4 are used throughout the central processor to clock various operations within microprocessor 101, virtual memory management unit 103, cache memory 107 and glue logic 105. FIG. 6 shows a timing diagram of various clock timing signals and ROS address and data signals and read error signals.

As indicated above, the system of the preferred embodiment is designed so that the subunits within the CPU are firmware controlled by microoperations with the microprocessor 101 responsible as the master subunit for calculating the address of the next microinstruction to be read, a part of it being read from microprocessor ROS 109, virtual memory ROS 111, cache ROS 115, and glue logic ROS 113. The CPU is designed so that during the execution of a first microinstruction the address of the second microinstruction is presented to each of the ROS's and the reading of the second microinstruction is initiated during the execution of the first microinstruction so that the second microinstruction will be available upon the completion of the execution of the first microinstruction. This overlapping of the reading of the next microinstruction during the execution of the current microinstruction is illustrated in FIG. 6 which shows that the 14-bit control store address signal ROSADDR on lines 102 is addressing control store location B during the end of cycle 2 while the contents of ROS data register 153, the output of which is the 67 firmware bits that control microprocessor 101 as signal RDROUT on lines 114 contain the contents of memory location A, whch is the current microinstruction being executed during cycle 2. In FIG. 6, the contents of a memory location is indicated by putting the memory location address "A", "B", "C", etc. within parentheses, as seen for signal RDROUT.

In the preferred embodiment, the time required to execute a microinstruction by the CPU is broken into four equal time periods: Time 1, Time 2, Time 3 and Time 4. The total time required to execute one microinstruction is approximately 160 nanoseconds and therefore Time 1 through Time 4 are each 40 nanoseconds long. The CPU logic utilizes timing signals T1 through T4 associated with Time 1 through Time 4 to clock various logic elements within the CPU. T1 through T4 are each in the binary ONE state for 40 nanoseconds during Time 1 through Time 4, respectively.

If there is no error in the CPU, CLK4 will be the same as the timing signal T4. If the cancel signal becomes a binary ONE, clock generator 125 will not produce signal CLK4 in the binary ONE state at the same time that timing signal T4 becomes a binary ONE. This can be seen in FIG. 6 wherein during cycle 5 a control store parity error was detected causing the cancel signal to become a binary ONE which in turn causes the CLK4 signal to remain in the binary ZERO state during the time that timing signal T4 is in the binary ONE state.

Before discussing how the various microprogrammed subunits in the CPU can affect the flow of the microprogram which is read from the common distributed control store, the operation of the logic in FIG. 4 will be described in conjunction with the timing of the various signals shown in FIG. 6. As described above, the address of the next microinstruction to be read from the control store is determined by the microprocessor 101. Within microprocessor 101, the generation of the next ROS addresss is primarily a function of next address generation logic 167, which receives as input some of the bits from the currently executing microinstruction which is stored in ROS data register 153 and is available as signal RDROUT on lines 114 and by the decoding of the microoperations encoded in the current microinstruction. The decoding of the microoperations is performed by microoperation decoder 161. FIG. 6 shows that the 14-bit ROS address at the output of next address generation logic 167 as signal ROSADDR on lines 102 is available during Times 3, 4 and 1 (i.e., when signals T3, T4 and T1 are high, respectively).

In FIG. 6, the shaded areas represent periods during which the state of the signals are indeterminate. For example, signal ROSADDR, which is the next ROS address, is indeterminate during Times 2. FIG. 6 shows that during the first microinstruction cycle (actually during Times 3 and 4 of cycle 1 and Time 1 of cycle 2), signal ROSADDR will contain the address of control store location A. During the second microinstruction cycle, ROSADDR contains the address of control store location B. During the third microinstruction cycle, it contains the address of control store location D, etc.

As long as there is not an unusual condition requiring the microprogram being executed within the CPU to branch to a microprogram routine to handle the unusual event, the address of the next microinstruction to be read from the control store is determined by logic within microprocessor 101 and the status of various registers and flip-flops within 101. In particular, next address generation logic 167 looks at addressing bits from ROS data ragister 153 and various microoperations which are decoded by micropperation decoder 161. The output of ROS data register 153 and microoperation decoder 161, absent the occurrence of an unusual event, control the output of next address generation logic 167 along with various status indicators which indicate the status of operations performed within microprocessor 101, for example, whether the last arithmetic operation which was performed resulted in an answer of 0, an odd or even number, a positive or negative number, or whether an overflow or underflow has occurred. At the same time that microprocessor 101 is executing part of the microinstruction read from the control store (i.e., that portion obtained from microprocessor ROS 109), virtual memory management unit 103 is executing that part of the microinstruction which is contained in ROS data register 155 by use of microoperation decoder 163. Similarly, cache memory 107 is executing that part of the microinstruction contained in ROS data register 157 as decoded by microoperation decoder 165. At the same time, glue logic 105 is executing that portion of the microinstruction contained in ROS data register 159 as decoded by microoperation decoding logic within trap enable logic 173 and other logic which is not shown.

As each microinstruction is executed with a part of it being processed by subunits 101, 103, 105 and 107, the address of the next microinstruction is developed by microprocessor 101 and the next microinstruction is read from the control store comprised of ROS 109, 111, 115 and 113. If virtual memory management unit 103 or cache memory unit 107 detects that a condition has arisen that requires execution of a special microprogram in order to be able to correct the condition, the virtual memory management unit 103 can set trap flip-flop 175 or cache memory unit 107 can set trap flip-flop 177, respectively, to handle its associated exception condition. For example, an exception condition can arise within virtual memory management unit 103 if the virtual address presented to it by the microprocessosr 101 via processor bus 138 cannot be converted to a physical address because a necessary page descriptor is not present within the virtual memory management unit and therefore the necessary page descriptor must be brought into the memory of the virtual memory management unit by performing a main memory read operation. Similarly, if the cache memory 107 determines that the location specified by the 30-bit physical address on lines 140 from virtual memory management unit 103 is not present within the relatively small cache memory of cache memory 107, then the cache memory 107 must access main memory 129 and read in a page of memory so that the referenced location can be retrieved from cache memory 107. In the case of a referenced location not being available in cache memory 107 or main memory 129, trap flip-flop 177 is set. The setting of trap flip-flop 175 causes signal VMINT on line 154 to become a binary ONE and the setting of trap flip-flop 177 causes signal CHCINT on line 156 to become a binary ONE.

Signal VMINT on line 154 and signal CHCINT on line 156 are both inputs to trap enable logic 173 in glue logic 105. If signal VMINT becomes a binary ONE at the input of trap enable logic 173, signal VMTRP on line 158 at one output of trap enable logic 173 will become a binary ONE unless a virtual memory trap inhibit bit within the segment of the microinstruction word contained in ROS data register 159 is a binary ONE. Similarly, if signal CHCINT becomes a binary ONE at the input of trap enable logic 173, signal UEVTRP on line 160 at the output of trap enable logic 173 will become a binary ONE unless an unusual event trap inhibit bit within the segment of the microinstruction word contained in ROS data register 159 is a binary ONE. Signal VMTRP on line 158 and signal UEVTRP on line 160 are inputs into next address generation logic 167 of micrprocessor 101. During the execution of the segment of the microinstruction located within ROS data register 153, if either of these signals VMTRP or UEVTRP is in the binary ONE state, the next address generation logic 167 instead of reading the next microinstruction from the location pointed to by the potential next ROS address will store the potential next ROS address and branch to either of two ROS location where microprogram routines are stored which handle the virtual memory and the cache memory trap conditions.

The actual condition in the virtual memory management unit 103 or cache memory 107 which caused the trap is then determined. Because there may be several conditions within virtual memory management unit 103 or cache memory 107 which can cause a trap to occur, the microprogram routine which handles the various traps is programmed so that either syndrome register 169 in virtual memory management unit 103 or syndrome register 171 in cache memory 107 is placed onto procesor bus 138 and read into microprocessor 101. The enabling of one of the syndrome registers 169 or 171 is controlled by a microoperation programmed into the microoinstructions is the trap handling microprogram. If syndrome register 169 is to be enabled onto processor bus 138, the segment of the microinstruction contained in ROS data register 155 will have an enabled syndrome register microoperation encoded within it which will be decoded by microoperation decoder 163 and, similarly, if the syndrome register 171 of cache memory 107 is to be enabled onto the processor bus, the segment of the microinstruction contained within ROS data register 157 will have an enable syndrome register microoperation encoded within it which will be decoded by a microoperation decoder 165. In any given microinstruction, only one of syndrome registers 169 or 171 should be enabled onto processor bus 138. Therefore, the microinstructions are programmed to either enable syndrome register 169 or syndrome register 171 onto processor bus 138.

Once the contents of either syndrome register 169 or 171 are placed on processor bus 138, and therefore available for entry into microprocessor 101, the microoperations executed by microprocessor 101 can then test the various bits within the syndrome register to determine the exact cause of the trap condition and then branch, under control of microoperations executed by microprocessor 101, to specific microprogrammed routines required to handle particular unusual event conditions. In order to eliminate the requirement that the syndrome register from virtual memory management unit be enabled onto processor bus 138 in order to determine the exact condition which caused the virtual memory trap to occur, virtual memory management unit 103 also sends to next address generation logic 167 3 signals VMVECT on lines 162. These 3 signals VMVECT are binary encoded such that eight possible conditions within virtual memory management unit 103 can be indicated to microprocessor 101 without having to enter the contents of syndrome register 169. Therefore, whenever virtual memory trap signal VMTRP becomes a binary ONE, instead of simply performing a branch to a single microprogrammed routine designed to handle the virtual memory trap, a branch is made to one of eight microprogram routines, each designed to handle one of the eight possible trap conditions which can be encoded onto signal VMVECT. By using this mechanism, the necessity for placing the contents of syndrome register 169 onto processor bus 38 in order to make it available to microprocessor 101 is eliminated thereby allowing the particular condition which caused the trap to be handled in a much more expedient manner. In the system of the preferred embodiment, six of the conditions which can cause the virtual memory trap to occur are handled without requiring the contents of syndrome register 169 to be entered into microprocessor 101. The seventh condition is a general condition and the specific cause of it must be determined by entering the contents of syndrome register 169 into microprocessor 101. The eighth possible condition is not used, but is available for future use if a particular condition within virtual memory management unit 103 must be handled in an expedient manner.

Figure 4:
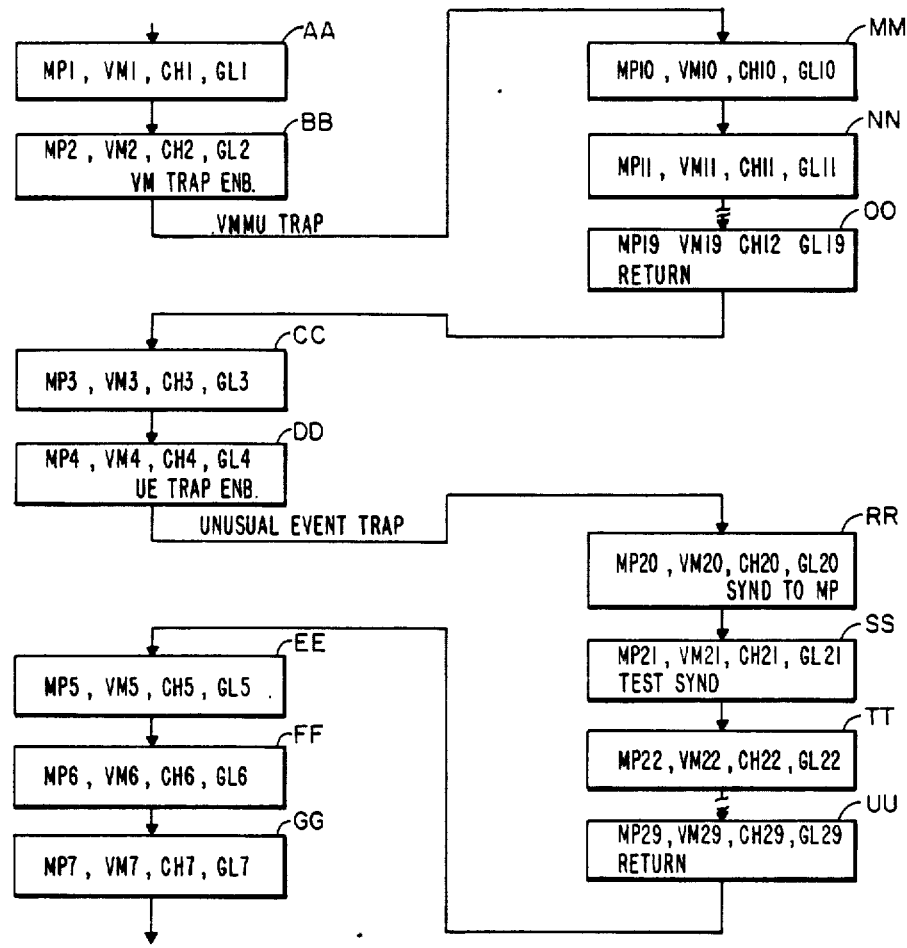
FIG. 4 is a flow chart of a microprogram to be executed by the data processing system of FIG. 3.

The manner in which the central processing unit of FIG. 3 is microprogrammed can be appreciated by examining the microprogram flow chart of FIG. 4. Block AA represents a microinstruction having microoperations MP1 which are read from microprocessor ROS 109 and executed by microprocessor 101, microoperations VM1 which are read from virtual memory ROS 111 and executed by virtual memory management unit 103, cache memory microoperations CH1 which are read from cache ROS 115 and executed by cache memory 107 and glue logic microoperations GL1 which are read frmo glue logic ROS 113 and executed by glue logic 105. During the time that the microinstruction of Block AA is executed, the microoperations executed by microprocessor 101 and, in particular, microoperations MP1 cause the address of the next microinstruction to be generated by next address generation logic 167 and will generate the address of the microinstruction of Block BB. The microinstruction of block BB is then addressed in the central control store and is executed during the next microinstruction cycle. When Block BB is executed, microoperations MP2, VM2, CH2 and GL2 are performed. In microinstruction BB, microoperations GL2 enable virtual memory trap so that if a virtual memory trap condition has occurred, the trap will be allowed to occur and the next microinstruction will be the first microinstruction of the microprogram written to handle the virtual memory trap.

If during the execution of the microinstruction of Block AA the trap condition arose due to the operation specified by microoperations VM1, which were performed by virtual memory management unit 103, or during an earlier virtual memory microoperation if the virtual memory trap was inhibited during the microinstruction of Block AA, then following the execution of the microinstruction of Block BB, the next microinstruction will not be taken from Block CC, but will instead be taken from Block MM which is a microprogram specifically written to handle the virtual memory trap. Therefore, upon completing the executing of Block BB, the next microinstruction was taken from Block MM, which is the first instruction of the virtual memory trap microprogram routine. In actuality, Block MM is the first microinstruction of one of eight microprogram routines written to handle the eight different possible trap conditions in which the specific microprogram routine to be executed is determined by the three signals VMVECT on lines 163 used to vector the trap to the specific routine programmed to handle the one of eight possible virtual memory trap conditions. In Block MM, the microinstruction is programmed to perform microoperations MP10, VM10, CH10 and GL10. The virtual memory trap microprogram routine then continues by performing microinstructions of Block NN, etc. until the microinstruction of Block OO is executed. In Block OO, the microinstruction is programmed so that the microoperation MP19 which is executed by microprocessor 101 will generate the address of the microinstruction associated with Block CC which would normally have been executed after the microinstruction of Block BB had the virtual memory management trap not occurred.

The microinstruction of Block CC is then executed, followed by the microinstruction of Block DD. During the execution of the microinstruction of Block CC, it is assumed that an unusual condition occurred within cache memory 107 which requires that a special microprogram routine be executed to handle the condition. In the microinstruction of Block DD, the microoperation GL4 which is executed by glue logic 105 enables unusual event traps so that the next address generation logic 167 will trap to the microprorgam written to handle the unusal events if the trap condition has occurred. Because a trap condition has occurred during the execution of the microinstruction of Block CC, during the execution of the microinstruction of Block DD, the address of the microinstruction of Block RR will be developed by next address generation logic 167 and the microinstruction of Block RR and will be read from the control store. The microinstruction of Block RR contains microoperations MP20, VM20, CH20 and GL20 which are executed by microprocessor 101, virtual memory management unit 103, cache memory 107 and glue logic 105, respectively. The microoperation CH20, which is executed by cache memory 107 contains a microoperations which enables syndrome register 171 onto processor bus 138 so that the contents of the syndrome register can be entered into microprocessor 101. The microinstruction of Block SS is then read from the control store and executed performing microoperations MP21, VM21, CH21 and Gl21. The microoperations of MP21, which is executed by microprocessor 101, may then do a test branch on various bits of the contents of syndrome register 171 as entered into microprocessor 101 and branch, depending upon which bit is set in syndrome register 171, to a particular portion of the unusual event microrprogram which is programmed to handle the particular condition associated with the set bits. Therefore, during the execution of the microinstruction of block SS, a testing of the various syndrome bits results in the next address generation logic 167 generating the address of the microinstruction of Block TT. The microinstruction of Block TT is read and then executed, followed by other microinstructions until the last microinstruction of the unusual event trap microprogram, which is block UU, is executed. The microinstruction of Block UU contains microoperation MP29, which is executed by microprocessor 101 and results in the return address being used as the next address of the microinstruction, which results in the microinstsruction of Block EE being read from the control store and executed next. Microinstruction EE then performs microoperations MP5, VM5, CH5 and GL5. Block EE is then followed by Blocks FF and GG and so on with the main microprogram continuing to execute unless interrupted by another trap.

Although each of the microinstructions illustrated in FIG. 4 contains a microoperation to be performed by microprocessor 101, virtual memory management unit 103, cache memory 107 and glue logic 105, in an actual microprogram certain of these microinstructions may specify a no operation to be performed by a particular subunit with the exception that the master subunit must always generate the next control store address so the next microinstruction can be read and executed.

Before discussing in detail how the traps control the flow of execution within the microprogram stored in the control store with reference to FIG. 5, a brief comparison of the difference between the prior art system and flow diagram of FIGS. 1 and 2 and the system of the present invention of FIG. 3 and its corresponding flow chart of FIG. 4 will be made.

Figure 1:
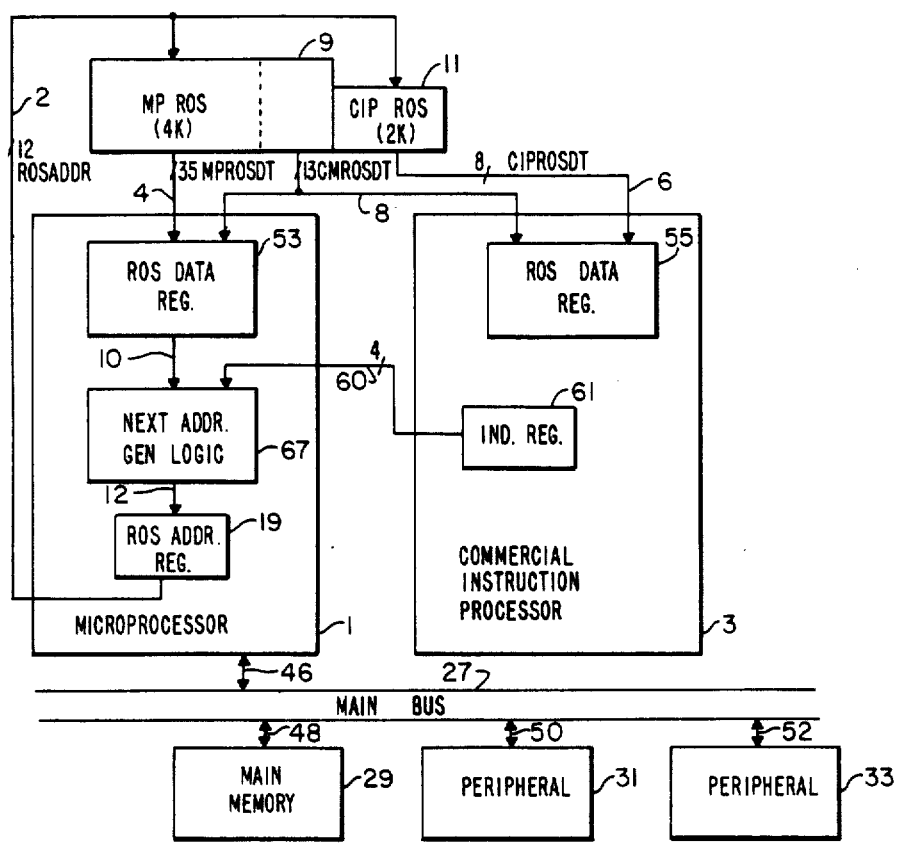
FIG. 1 is a block diagram of a prior art data processing system in which two subunits are controlled by a common control store.

In the system of FIG. 1, the microprogrammed subunits are closely coupled in that each subunit has the ability to directly affect the next control store address generated by next address generation logic 67. This is done by allowing conditions within microprocessor 1 to directly affect the outcome of next address generation logic 67 and by allowing conditions within commercial instruction processor 3 to directly affect the next address generation logic by having signals on lines 60 from indicator register 61 be inputs into next address generation logic 67. As is seen in FIG. 2, these conditions are tested by the microprocessor 1 performing branching microoperations, and in particular, a branch on the indicator registers is performed in the microinstruction associated with Block CC. Although not shown in FIG. 3, other branching microoperations can be performed by microprocessor 1 in order to test for various conditions witihn microprocessor 1 itself. The system of FIG. 1 has the limitation that the addition of other microprogrammed subunits cannot easily be made unless such additions have been pre-envisioned by providing for spare inputs into next address generation logic 67 along with spare microoperations to be performed by microprocessor 1 to test the state of the spare inputs.

This is to be contrasted with the system of the present invention of FIG. 3 which provides for a number of microprogrammed subunits to be added to this system by simply providing for the subunit to cause a trap to microprocessor 101 with the microprogram programmed to handle the trap by providing for the entry into microprocessor 101 via processor bus 138 the contents of its syndrome register as an indication of the condition which caused the trap.

For example, a fifth microprogrammed subunit could be added to the system of FIG. 3 by adding a fifth ROS and providing for a syndrome register which could be gated onto processor bus 138. In addition, within this fifth microprogrammed subunit, a trap flip-flop would be provided which would be set by the trap condition and the output of that trap flip-flop would be ORed with the output of trap flip-flop 177 from cache memory 107. The trap microprogram routine which handles the unusual event trap could then be programmed to first poll the cache memory and analyze the contents of syndrome register 171 to see whether the cache memory 107 caused the trap and if no indication is found there to then read the contents of the syndrome register of the fifth subunit and test whether any condition within it caused the unusual event trap to occur.

Figure 2:
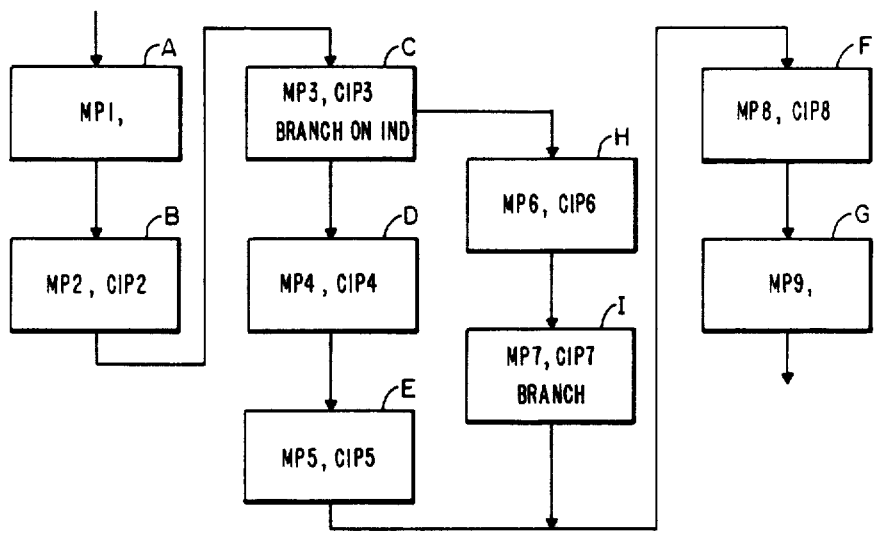
FIG. 2 is a flow chart of a microprogram to be executed by the data processing system of FIG. 1.

A comparison of FIG. 4 with FIG. 2 shows that the system of the present invention has the further advantage that the microprogram or the present invention can be written without having to take into account those conditions in the various subunits which may cause a trap to occur so that the main microprogram of FIG. 4, which is comprised of Blocks AA through GG, can be written without regard to conditions which may arise in virtual memory management unit 103 or cache memory 107. These unusual events, which can occur, are handled by writing trap microprogrammed routines such as those containing Blocks MM, NN and OO for handling a virtual memory trap and Blocks RR through Blocks UU for handling the unusual event trap. This is to contrasted with the microprogram of FIG. 2 in which the microprogrammer must be aware of possible conditions which can arise in commercial instruction processer 3 and must test for those conditions within the program by performing branching microoperations.

Figure 5:
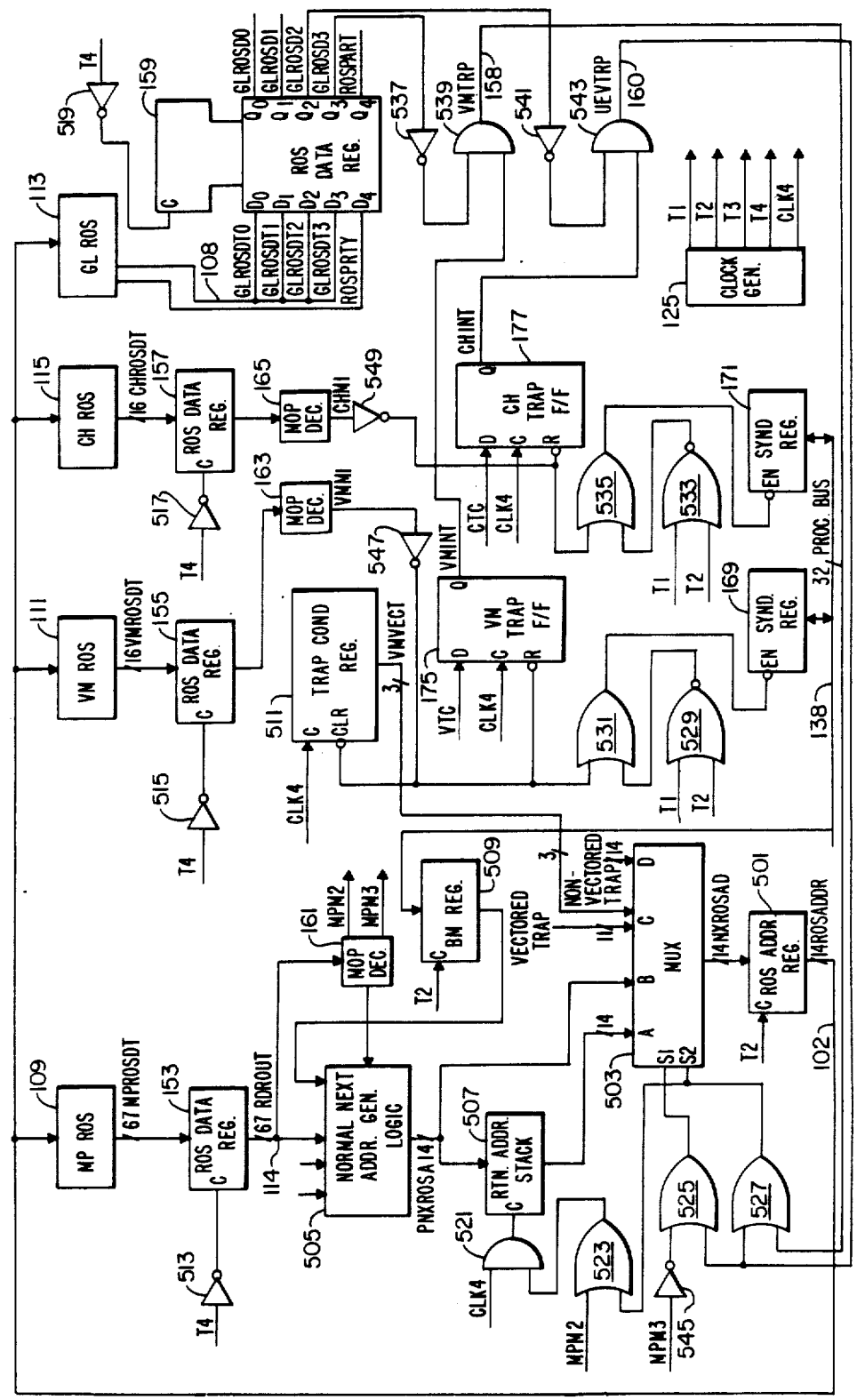
FIG. 5 is a more detailed logic block diagram of the microprogrammed subunits of the central processor of FIG. 3.

FIG. 5 illustrates a more detailed logic block diagram of some of the logic shown in FIG. 3. The small circles on the inputs, such as the enable input of register 169, or outputs of the elements in FIG. 5 indicate an inverting input or output, respectively. As indicated above, during execution of a current microinstruction, segments of which are executed within microprocessor 101, virtual memory management unit 103, cache memory 107 and glue logic 105 (see FIG. 3), the next address generation logic 167 generates the address of the next microinstruction to be read from the control store, segments of which are read from ROS 109, 111, 115 and 113, respectively. Therefore, during Time 2 of the current microinstruction, ROS address register 501 is clocked by signal T2 at its clock (C) input thus making its 14-bit output, signal ROSADDR on line 102, contain the address of the next location in the control store which is to be read in order to read the next microinstruction. By the end of the current microinstruction cycle, the next microinstruction will have been read from the control store and be available at the data outputs of the respective ROS's 109, 111, 115 and 113. This next microinstruction is then clocked into ROS data registers 153, 155, 157 and 159 at the end of Time 4 when the timing signal T4 transitions from the binary ONE to the binary ZERO state which will cause the outputs of inverters 513, 515, 517 and 519, respectively, to transition from the binary ZERO to the binary ONE state at the clock inputs of ROS registers 153, 155, 157 and 159, respectively. Thus, at the beginning of the next microinstruction cycle, the next microinstruction is contained within the various ROS data registers.

During the execution of the next microinstruction, which has become to current microinstruction, the next address generation logic 167 (see FIG. 3) generates the address of the next microinstrution. In FIG. 5, greater detail of the next address generation logic 167 is shown which illustrates that it is comprised of normal next address generation logic 505, a return address stack 507 and a multiplexer 503. Normal next address generation logic 505 receives as inputs various bits from ROS data register 153, as well as status information from within the microprocessor 101 which, as indicated above, may contain indications as to whether the last arithmetic operation performed produced a 0 result, an even result, a positive result, negative result, whether overflow occurred, etc. Normal next address generation logic 505 also receives input from microoperation decoder 161, which decodes various microoperations such as branching microoperation, or a branch on overflow microoperation and thereby provides inputs into the normal next address generation logic 505. Normal next address generation logic 505 produces as output a 14-bit control store address PNXROSA, which is the potential next ROS address. This address is presented to the B inputs of multiplexer 503 as well as to the inputs of return address stack 507.

The A input of multiplexer 503 is connected to receive an address output by return address stack 507. Return address stack 507 is a push down stack, which in the preferred embodiment is 8 levels deep. Each time return address stack 507 is clocked when in the push mode, it pushes down the contents of the stack and places on top of the stack the 14-bit address output by normal next address generation logic 505. Each time the stack is popped, it takes from the top of the stack a 14-bit address and presents it to the A inputs of multiplexer 503. Pushing onto the stack is controlled by the clock (C) input which receives as output the signal from AND gate 521. AND gate 521 receives as input clocking signal CLK4, which if there has not been an error, will be in the binary ONE state during the time the clock signal T4 is in the binary ONE state as is shown in FIG. 6. The other input to AND gate 521 is the output of OR gate 523. One input of OR gate 523 is signal MPM2, which comes from microoperation decoder 161. If the microoperation specified in the ROS data register 153 indicates that an address is to be pushed onto return address stack 507, signal MPM2 will be a binary ONE making the output of OR gate 523 a binary ONE which will partially enable AND gate 521 and, when Time 4 occurs, will result in it being fully enabled thus clocking the return address stack 507 thereby pushing a 14-bit address onto the top of the stack. The other input to OR gate 523 is the output of OR gate 527. The two signals which are input to OR gate 527 are signals VMTRAP on line 158, which indicates that a virtual memory trap condition has occurred and signal UEVTRP on line 160 which is a binary ONE if an unexpected event condition has occurred. Thus, it can appreciated that the output of OR gate 527 will be in the binary ONE state causing the output of OR gate 523 to be in the binary ONE state whenever a virtual memory trap condition or an unexpected event trap condition has occurred within the system. Either one of these conditions will therefore cause the pushing onto return address stack 507 during Time 4 of a current microinstruction cycle the potential next ROS address, signal PNXROSA.

The C inputs of multiplexer 503 receive the 14-bit address from two sources. Eleven of the bits are preconfigured to be either a binary ONE or a binary Zero and three of the bits are signal VMVECT from trap condition register 511. The combining of the three bits from signal VMVECT, which are in the binary ZERO or the binary ONE state depending upon what trap condition has occurred within virtual memory management unit 103, along with the eleven predetermined bits allow for an 8-way branch to 8 different virtual memory trap microprogram routines to handle the eight different possible trap conditions.

The D iputs of multiplexer 503 are 14 predetermined bits, which specify the starting address of the non-vectored unusual event trap microprogram routine, which is to be executed if the unexpected event trap has occurred.

Multiplexer 503 selects either the A, B, C or D inputs depending upon the state of the select (S1 and S2) inputs which are binary encoded to provide selection of one of the four inputs. Input A of multiplexer 503 is selected if S1 is a binary ZERO and S2 is a binary ZERO. S1 will be a binary ZERO if the output of OR gate 525 is a binary ZERO. The output of OR gate 525 will be a binary ZERO if signal UEVTRP on line 160 is a binary ZERO indicating the no unexpected event trap condition has occurred and if signal MPM3 from microoperation decoder 161 is a binary ONE making the output of inverter 545 a binary ZERO. Signal MPM3 from microoperation decoder 161 will be a binary ONE if the microinstruction contained in ROS data register 153 specifies a return microoperation indicating that the next ROS address should be taken from the top of return address stack 507.

The B input of multiplexer 503 will be selected to be gated onto its outputs if the signal at the S1 input is a binary ONE and the signal at the S2 input is a binary ZERO. The signal at the S1 input will be a binary ONE if microoperation decoder 161 has not decoded a return microoperation, thus making signal MPM3 a binary ZERO and causing the output of inverter 545 to be binary ONE, or if an unexpected event trap condition has occurred, thus making signal UEVTRP a binary ONE at the other input of OR gate 525. The signal at the S2 input will be in the binary ZERO state if the output of OR gate 527 is a binary ZERO which will occur if neither a virtual memory trap or an unexpected event trap condition has occurred, thus making signals VMTRP and UEVTRP binary ZEROs.

The C input of multiplexer 503 will be selected to be gated onto its outputs if signal S1 is in the binary ZERO state and signal S2 is in the binary ONE state. This condition will occur if signal UEVTRP is in the binary ZERO state at one input of OR gate 525 indicating that no unexpected event trap condition has occurred and if signal VMTRP at one input of OR gate 527 is in the binary ONE state indicating that a virtual memory trap condition has occurred.

The D inputs of multiplexer 503 will be gated onto its outputs as signal NXROSAD if select signal S1 is in the binary ONE state and select signal S2 is also in the binary ONE state. This condition will occur if an unexpected event trap condition has occurred causing signal UEVTRP at one input of OR gate 525 and one input of OR gate 527 to be in the binary ONE state.

From the above discussion of the operation of next address generation logic 167 (see FIG. 3), it can be appreciated that if a trap condition occurs, either the C or D inputs of multiplexer 502 will be selected and gate onto its outputs and that a push operation of the potential next ROS address, signal PNXROSA, will be done pushing it onto the top of return address stack 507. It can also be appreciated from the above discussion that if both an unexptected event trap and a virtual memory trap condition occur at the same time, inputs D of multiplexer 503 will be selected thereby giving the unexpected event trap condition higher priority than the virtual memory trap condition.

As indicated above, virtual memory trap flip-flop 175 is set whenever a condition arises within virtual memory management unit 103, which requires that a special microprogram routine be executed to handle the condition. Similarly. cache trap flip-flop 177 is set whenever conditions arise within cache memory 107 requiring the execution of a special microprogram. Virtual memory trap flip-flop 175 is set if signal VTC at its data (D) input is a binary ONE at the time that clocking signal CLK4 at the clock (C) input transitions from the binary ZERO to the binary ONE state. Signal VTC will be in the binary ONE state if a trap condition has occurred within virtual memory management unit 103. Similarly, cache memory trap flip-flop 177 is set if signal CTC at its data (D) input is in the binary ONE state when clocking signal CLK4 transitions from the binary ZERO to the binary ONE state at the beginning of Time 4, which occurs near the end of the execution of the current microinstruction. Signal CTC will be in the binary OE state if a condition has occurred in the cache memory 107 which requires that a special microprogram be executed in order to take care of the condition.

If virtual memory trap flip-flop 177 is set, signal VMINT at its Q output will become a binary ONE partially enabling AMD gate 539. If cache memory trap flip-flop 177 is set, signal CHINT at its Q output will be a binary ONE partially enabling AND gate 543. The other input to AND gate 539 is the output of inverter 537 and the other input of AND gate 543 is the output of inverter 541. The input to inverter 537 is signal GLROSD3 from the Q3 output of ROS data register 159. The input to inverter 541 is signal GLROSD2 at the Q2 output of ROS data register 159. As indicated before, ROS data register 159 is clocked by signal T4 transitioning from the binary ONE to the binary ZERO state at the end of Time 4 thus clocking into ROS data register 159 the output of glue logic ROS 131, which is connected to data inputs D0 through D4. Signal GLROSDT2 at the D2 input will be in the binary ONE state if the unexpected event trap is to be inhibited and signal GLROSDT3 at the D3 input will be in the binary ONE state if the virtual memory trap is to be inhibited. These signals, which correspond to bits within the microinstruction word, thereby permit an inhibiting of either the unexpected event trap or the virtual memory trap by the disabling of AND gate 543 and 539, respectively.

If AND gate 543 and 539 are not disabled by the inhibiting of the traps, then the unexpected even trap signal UEVTRP on line 160 will be in the binary ONE state if cache memory trap flip-flop 177 is set and the virtual memory trap signal VMTRP on line 158 will be in the binary ONE state is virtual memory trap flip-flop 175 is set. Ifleither trap flip-flop 175 or 177 is set, one of these signals will be in the binary ONE state and cause multiplexer 503 to select either the C or D inputs and cause the next microinstruction to be read from a control store location which is the beginning of a trap handling microroutine.

As indicated above, when either the C or D inputs to multiplexer 503 are selected, the potential next ROS address, which is signal PNSROSA from normal next address generation logic 505, is pushed onto return address stack 507 so that it will be later available to be popped off the stack when the trap service microprogrammed routine has been completed. If an unexpected event trap has occurred causing multiplexer 503 to select the D inputs to be gated onto its output, the microprogram which is entered can then transfer to the microprocessor 101 the contents of syndrome register 171 by programming within the microinstruction a microoperation which will be decoded by microoperation decoder 165 causing its output, signal CHM1, to become a binary ONE. When signal CHM1 becomes a binary ONE, it causes the output of inverter 549 to become a binary ZERO. The output of inverter 549 is connected to the reset (R) input of cache memory trap flip-flop 177 causing it to be reset and it is also connected to one input of OR gate 535. The other input of OR gate 535 comes from NOR gate 533 which has as inputs signals T1 and T2 which are at their binary ONE state during Time 1 and Time 2, respectively. The output of NOR gate 533 will be in the binary ZERO state during Time 1 and Time 2 of a microinstruction cycle, thus causing the output of OR gate 535 to be in the binary ZERO state during Time 1 and Time 2 if signal CHM1 from microoperaiton decoder 165 is in the binary ONE state. A binary ZERO output from OR gate 535 will enable the outputs of syndrome register 171 onto processor bus 138. Thus, if a CHM1 microoperation has been programmed within the microinstruction, cache memory trap flip-flop 177 will be reset clearing the trap condition and the contents of the syndrome register 171 will be put on a processor bus 138 which is input into BM register 509 of the microprocessor 101 during Time 2 by clocking signal T2 at its clock (C) input. The output of BM register 509 is input into normal next address generation logic 505 thus allowing the syndrome bits from syndrome register 171, which indicate the specific condition which cause the cache memory trap to occur, can be tested within microprocessor 101 and a branch performed depending upon which syndrome bit is set.

Virtual memory trap flip-flop 175 and syndrome register 169 operation in a similar manner to cache memory trap flip-flop 177 and syndrome register 171 in that they are also cleared and enabled onto the processor bus by a microoperation programmed within the microinstruction with the decoding being done by microoperation decoder 163 which produces signal VMM1 in the binary ONE state if the microoperation is present. Signal VMM1, as inverted by inverter 547, enables syndrome register 169 onto processor bus 138 by producing a binary ZERO via OR gate 531 in conjunction with signals T1 and T2 via NOR gate 529. In addition to clearing virtual memory trap flip-flop 175, the microoperation also clears trap condition register 511 which is used to hold the three bits which determine which of the eight possible conditions caused the virtual memory trap condition and which are used to control an 8-way vectored trap via multiplexer 503.

From the above discussion, it can be appreciated that the occurrence of a trap condition within a subunit of the system will result in a trap flip-flop being set during Time 4 of the current microinstruction. During the execution of the next microinstruction, if the next microinstruction does not have microoperations programmed within it which inhibit the occurrence of traps thereby disabling AND gates 539 or 543 during the execution of the next microinstruction, the next address generation logic will generate the address of the microprogram routine which was progrmmed to handle the trap condition and will push onto return stack 507 the address of the next microinstruction which would have been executed had the trap condition not occurred. During the execution of the trap handling microprogram, the microprogram can be programmed microoperations place the contents of a syndrome register onto processor bus 138 which is then input to microprocessor 101 which can then examine the syndrome bits and determine exactly what condition arose which caused the trap. At the end of the trap handling microprogram, a microoperation can be programmed which is decoded by microoperation decoder 161 and causes the return address to be popped off of return address stack 507 thus returning execution to the microprogram which was interrupted when the trap condition occurred.

The next ROS address output by multiplexer 503 is latched into ROS address register 501 by clocking signal T2 at its clock (C) input. ROS address register 209 is a transparent type latch which enables its inputs onto its outputs during the time that the clocking signal is in the binary ONE state and latches the inputs onto the outputs when the clocking signal transitions from the binary ONE to the binary ZERO state. This is illustrated in FIG. 6 which shows that during the first miroinstruction cycle the ROS address signal ROSADDR points to location A within the control store during Times 3 and 4 of cycle 1 and Time 1 of cycle 2. FIG. 6 shows that the ROS address is indeterminate during Time 2 and that the inputs are latched onto the outputs at the end of Time 2.

The 14-bit ROS address ROSADDR on lines 102 is input to the address inputs of microprocessor ROS 109 to address one of the 16K locations within the control store. This 14-bit ROS address is also presented to the other portions of the control store, which are the virtual memory ROS 111, glue logic ROS 113, and cache ROS 115. These ROS's are always read enabled by the write enable input being in the binary ZERO state. After the ROS address has been established at the address inputs of the control store for a sufficient period of time to allow the ROS to read out the addressed location, the corresponding data becomes available at the data outputs of the various ROS's, and in particular, 67 bits of ROS data become available on lines 104 as signal MPROSDT. The contents of the address microinstruction location becomes available. sometimes during Time 4 and remains available during Time 1. The output of inverter 513 is connected to the clock (C) input of ROS data register 153 which is a D-type register. When timing signal T4 at the input of inverter 513 becomes a binary ZERO, its output becomes a binary ONE and clocks ROS data register 153. Thus, it can be seen in FIG. 6 that at the end of Time 4, the 67-bit output signal on lines 114, which is signal RDROUT, will be set equal to the signal MPROSTD, which is at the input of ROS data register 153. Thus, during the second microinstruction cycle in FIG. 6, signal RDROUT contains the contents of location A of the control store and the address of location A was presented to the address inputs of the control store during the previous microinstruction cycle. Thus, it can be seen that microprocessor 101 generates the address of the next microinstruction during the execution of the current microinstruction.

From the above discussion, and by looking at signal ROSADDR and signal RDROUT in FIG. 6, it can be appreciated that during one microinstruction cycle, the address of the next microinstruction is developed while the current micronstruction is executed and using that developed address the reading of the next microinstruction from the control store is begun such that the microinstruction will be available at the beginning of the next cycle.

Although the above discussion has been in terms of a control store being used to control the execution of microinstructions in a central processing unit, the above principles are equally applicable to a control store being used to control the execution of microinstructions in other processing units. Further, although the above discussion has been in terms of having a central control store divided into multiple smaller control substores, each feeding a single subunit, the principles of the present invention are equally applicable to a single control store feeding one or a plurality of subunits.

Although the above discussion has been in terms of a system containing four subunits which are microprogrammed and two of which can cause a trap condition to occur, the principle of the present invention can be applied to a system having more or fewer microprogrammed subunits. If more subunits are added to the system which can cause a common trap condition to occur, it is simply a matter of adding to each subunit a syndrome register which can be selectively gated onto the processor bus so that the microprogram, which responds to the common trap condition, can poll the various subunits and find out which subunit caused the trap to occur. By adding microprogrammed subunits to the system in this manner, microprogrammed subunits can added to the system without requiring any changes within the master subunit which generates the next micronstruction address.

Although the above discussion has been in terms of having the execution of a current microinstruction overlapped by the reading of the next microinstruction, the principles of the present invention are equally applicable if the execution of one micronstruction overlaps the reading of a plurality of microinstructions or if the reading of the next microinstruction does not begin before the completion of the execution of the current microinstruction.

While the invention has been shown and described with reference to the preferred embodiment thereof, it will be understood by those skilled in the art that the above and other changes in form and detail may be made therein without departing from the spirit and scope of the invention.

What is claimed is:

1. A microprogrammable system comprising:
A. a plurality of microprogrammable subunits, one of said subunits being a master subunit which generates microinstruction addresses;
B. A control store made up of a plurality of control substores, each of said plurality of control substores for controlling a corresponding one of said plurality of subunits, each of said plurality of control substores for storing a portion of ones of said microinstruction addresses wherein the reading of one of said microinstruction from said control store occurs by reading a portion of said microinstruction from each of said plurality of control substores in parallel, each of said plurality of control substores having an address input and a data output, said address input of each of said plurality of control substores coupled to said master subunit for receiving ones of said microinstruction addresses, said data output of each of said plurality of control substores having microinstructions thereon and is coupled to its said corresponding subunit to control microoperations executed thereby;
C. a next address generation means included in said master subunit for generating said microinstruction addresses;
D. trap request means included in a first subunit of said plurality of subunits for generating a trap signal to said master subunit indicating that an exception condition has occurred in said first subunit which requires an exception condition microprogram to be executed;
E. trap responsive means included in said next address generation means which causes said next address generation means to generate a predetermined trap address as said microinstruction address to said plurality of control substores, said predetermined trap address pointing to where segments of said exception condition microprogram are stored; in each of the control substores, said plurality of subunits each being responsive to the generation of said trap address for executing segment of the microinstruction located within the corresponding one of said control substores in parallel
F. a first syndrome register in said first subunit for storing one or more indicators regarding the status of processing being done in said first subunit ,said exception condition microprogram causing said indicators to be read from said first syndrome register and forwarded to said masater subunit to be tested for exception conditions within said first subunit, and
G. a first decoder means included in said first subunit and coupled to said first syndrome register, said first decoder means being responsive to segment of the microinstruction in said exception condition microprogram output from the control substore of said first subunit to enable the contents of said first syndrome register to be read out to said master subunit; wherein during normal operation of said system, the execution of said microinstructions in said first subunit is controlled by conditions within said master subunit, but wherein said first subunit can cause said exception condition microprogram to be executed to remove said exception conditions by generating said trap signal.

2. The system of claim 1 further comprising:
A. trap request means included in a second subunit of said plurality of subunits for generating a trap signal to said master subunit indicating that an exception condition has occurred in said second subunit which requires said exception condition microprogram to be executed;
B. a second syndrome register coupled to said next address generation means, said second syndrome register for storing one or more indicators regarding the status of processing being done in a second subunit of said plurality of subunits, said exception condition microprogram causing said indicators stored in said second syndrome register to be read therefrom and forwarded to said master subunit to be tested for exception conditions within said second subunit; and
C. a second decoder means included in said second subunit and coupled to said second syndrome register, said second decoder means being responsive to a segment of the microinstruction in said exception condition microprogram output from the substore of said second subunit control substores to enable the contents of said second syndrome register to be read out to said master subunit, and wherein said master subunit is responsive to a trap signal from either said first subunit or said second subunit to apply a microinstruction address to the control substore of the subunit that generated the trap signal to read out the corresponding syndrome register to said master subunit for testing and generation of subsequent microinstruction addresses which will remove said exception condition.

3. The system of claim 1 further comprising:

A. a trap condition register in said first subunit and coupled to said next address generation means in said master subunit, said trap condition register indicating exception conditions within said first subunit which require execution of an exception condition microprogram directly to said next address register without generating said trap signal; and B. a vectored trap responsive means included in said next address generation means and coupled to said trap condition register, said vectored trap responsive means generating microinstruction addresses from said exception condition microprogram to the control substore of said first subunit responsive to receiving an indication of an exception condition directly from an trap condition register.

4. The system of claim 1 further comprising a trap inhibit means included in a second subunit of a plurality of subunits and coupled to said trap request means, said trap inhibit means responsive to a second microoperation storable in said second subunit's corresponding control substore, said trap inhibit means for disabling said trap request means from generating said trap signal to said master subunit.

5. The system of claim 4 wherein said second subunit is said master subunit.

6. The system of claim 4 wherein said second subunit is not said first subunit or said master subunit.

7. The system of claim 1 wherein the execution of said microinstructions occurs by each of said subunits of said plurality of subunits executing its microoperations in parallel with the execution of the microoperations in the other subunits of said plurality of subunits.

8. The system of claim 1 wherein the generation of a next microinstruction address overlaps the execution of a current microinstruction.

* * * * *